United States Patent [19]
Reier

[11] Patent Number: 5,676,281
[45] Date of Patent: Oct. 14, 1997

[54] FLUID FLOW AIRLOCK VALVE

[75] Inventor: Gerald J. Reier, Arlington, Tex.

[73] Assignee: BHM Company, Fort Worth, Tex.

[21] Appl. No.: 741,133

[22] Filed: Oct. 31, 1996

Related U.S. Application Data

[63] Continuation of Ser. No. 423,824, Apr. 19, 1995, abandoned, which is a continuation-in-part of Ser. No. 218,901, Mar. 28, 1994, abandoned.

[51] Int. Cl.$^6$ ........................................ B67D 5/06
[52] U.S. Cl. ........................... 222/195; 222/424.5
[58] Field of Search .................. 222/19.5, 424.5; 137/268; 406/86, 88, 89, 96, 91, 136, 137, 138

[56] References Cited

U.S. PATENT DOCUMENTS

| | | | |
|---|---|---|---|
| 2,316,814 | 4/1943 | Schemm | 406/89 |
| 4,017,281 | 4/1977 | Johnstone | 55/334 |
| 4,189,263 | 2/1980 | Krug, Jr. et al. | 406/137 |
| 4,481,022 | 11/1984 | Reier | 55/341 |
| 5,035,543 | 7/1991 | Medemblik et al. | 406/39 |
| 5,037,067 | 8/1991 | Ray | 251/314 |
| 5,163,656 | 11/1992 | Sigmon | 251/314 |

*Primary Examiner*—Andres Kashnikow
*Assistant Examiner*—Kenneth Bomberg
*Attorney, Agent, or Firm*—Charles D. Gunter, Jr.

[57] ABSTRACT

An improved airlock valve is shown which is used to pass a particulate solid from a first pressure environment to a second, different pressure environment. The valve includes an inlet chamber for receiving particulate solids entering at a first pressure and has an outlet chamber for receiving particulate solids passing from the inlet chamber. The outlet chamber has a discharge opening which communicates with a second pressure environment which is different from the first pressure environment. At least one baffle divides the inlet chamber and the outlet chamber. Compressed air is supplied to the lower regions of the inlet and outlet chambers by means of a supply tube having downwardly facing apertures in order to fluidize the particulate solids. The fluidization of the particles causes the solids to pass from the inlet chamber to the outlet chamber and out the discharge opening of the outlet chamber to the second, different pressure environment while maintaining an air tight seal between the inlet and discharge openings.

10 Claims, 2 Drawing Sheets

FLUID FLOW AIRLOCK VALVE

CROSS REFERENCE TO RELATED APPLICATIONS

This is a continuation of application Ser. No. 08/423,824, filed Apr. 19, 1995, now abandoned, which application is a continuation-in-part of my earlier filed application, Ser. No. 08/218,901, filed Mar. 28, 1994, entitled "Fluid Flow Airlock Valve", by Gerald J. Reier, now abandoned.

BACKGROUND OF THE INVENTION

1. Field of the Invention

The present invention relates generally to material transfer systems and devices and, particularly, to an improved, vaneless, rotorless airlock valve for devices operating in two pressure environments.

2. Description of the Prior Art

Rotary airlock valves have been used widely in the past as feeders, airlocks or feeder-airlocks in a variety of industries. When used as an airlock, the rotary airlock valve passes particulate solids between a first pressure environment and a second, different pressure environment. One common use of such rotary valve airlocks is in the hopper discharge of particulate solids which have been collected in fabric filter-type dust collectors. The rotary airlock provides a near air tight seal to minimize inleakage from outside air or exhaust of inside air in positive pressure environments. Also, on a suction system, any air which is introduced to the hopper through the discharge opening causes re-entrainment of dust to the fabric filter of the dust collector, e.g., the bag of the baghouse. Excessive air leakage can also cause a reduction in feeding capacity through the unit.

The prior art mechanical rotary airlock valves were typically cast iron housings complete with machined vanes on a machined rotor or shaft. These vanes were often equipped with seal and/or wear strips which are typically constructed of neoprene, Teflon, urethane, stainless steel or brass. The strips are typically bolted to the vanes on the rotor to allow ease of removal for change out or adjustment. The prior art mechanical rotary valves having rotors without seal and/or wear strips were furnished machined to aerospace tolerances with inlaid edges and/or hard flared edges in various wear resistant materials including alloy materials.

The previously described rotary valves utilized special machining to minimize air leakage between the rotor vanes and housing. A near air tight seal could only be achieved with close tolerance machining of the internal mating surfaces of the rotary valve to maximize the air seal. Special bearings, packing glands and seals were also utilized on the rotor shaft penetrating the housing sidewalls and oversize shafts were utilized to provide maximum torque to the rotor. Air pumps were typically utilized to help prevent leakage through the valve and protect the packings and bearings as well as the special coatings and materials used for wear, corrosion and abrasion applications. The drive mechanism utilized for the typical prior art rotary airlock valve was an electric motor which was connected by means of sprockets, chains and gears to the rotor shaft. These items were all wear susceptible or consumable, requiring that the items be replaced or rebuilt during the life of the valve which was typically about 2 to 3 years in use.

In an attempt to overcome certain of the aforementioned difficulties regarding mechanically operated rotary valves of the type described, various vaneless airlock valves have been proposed. U.S. Pat. No. 5,163,656, issued Nov. 17, 1992, to Sigmon is typical of such designs. This design includes a housing, a hollow rotor having an opening in its cylindrical outer surface and first and second opposed valve seats which each includes a spherical inner and outer surfaces. A sealing surface extends between the inner and outer surfaces. The rotor is supported in the housing to rotate about its major axis, with the valve seats supported by the housing, such that the sealing surfaces of the valve seats engage the rotor. Even with a vaneless design, however, exact tolerances and special machining was required for the rotor and the previously mentioned disadvantages associated with the drive mechanism were still present.

The present invention has an object to provide an airlock valve which is characterized by the absence of moving parts and which does not require a drive motor, drive belt or gearing.

Another object of the invention is to ensure a 100 percent air tight seal by providing such an airlock valve which does not require special fabrication or high tolerances of mating parts and which is characterized by an absence of abrasive contact surfaces.

Another object of the invention is to provide such an airlock design which is well adapted for high temperature application, such temperatures being in the range of 800° F. when the device is constructed of standard materials.

Another object of the invention is to provide an airlock valve which is economical in design and inexpensive to manufacture and which does not require special seals, packings, or bearings in order to ensure a 100 percent air tight enclosure.

Another object of the invention is to provide an airlock valve which provides an air tight seal between the inlet and discharge sides of the valve.

Another object of the invention is to provide such an airlock valve which is designed to preserve 100 percent pressure or vacuum within the system which it is designed to seal.

SUMMARY OF THE INVENTION

The improved airlock valve of the invention can be used to pass particulate solids from a first pressure environment to a second, different pressure environment while maintaining a 100 percent air tight seal to prevent leakage or ingress of outside air. The valve includes an inlet chamber for receiving particulate solids entering at a first pressure. An outlet chamber is also provided for receiving particulate solids passing from the inlet chamber. The outlet chamber has a discharge opening which communicates with a second pressure environment different from the first pressure environment. The airlock valve provides a 100 percent air tight seal between the inlet and outlet or discharge sides of the valve.

At least one baffle divides the inlet chamber and the outlet chamber. A fluidization means is provided for fluidizing particulate solids in the inlet and outlet chambers, whereby particulate solids pass from the inlet chamber to the outlet chamber and out the discharge opening of the outlet chamber to the second, different pressure environment. The discharge opening includes a wall portion which acts as a weir in discharging particulate solids which pass through the inlet chamber, around the baffle, and out the discharge opening.

The fluidization means preferably includes a pneumatic supply tube which communicates a pressurized gas to the particulate solids contained within the inlet chamber and the outlet chamber for fluidizing the particulate solids contained therein.

The improved airlock valve is particularly adapted for use on the hopper discharge of a fabric filter dust collector used to collect and pass particulate solids from a first pressure environment to a second, different pressure environment. In such an arrangement, the airlock valve includes a valve body having an inlet chamber which communicates with the hopper discharge of the fabric filter dust collector for receiving particulate solids entering at a first pressure. The valve body also has an outlet chamber for receiving particulate solids passing from the inlet chamber, the outlet chamber also having a discharge opening which includes a weir which communicates with a second pressure environment different from the first pressure environment. At least one baffle divides the inlet chamber and the outlet chamber within the valve body. A fluidization means located within the valve body fluidizes particulate solids in the inlet and outlet chambers, whereby the fluidized particulate solids pass around the baffle from the inlet chamber to the outlet chamber and over the weir of the discharge opening to thereby discharge particulate solids to the second, different pressure environment.

Additional objects, features and advantages will be apparent in the written description which follows.

DETAILED DESCRIPTION OF THE INVENTION

Figure 1:
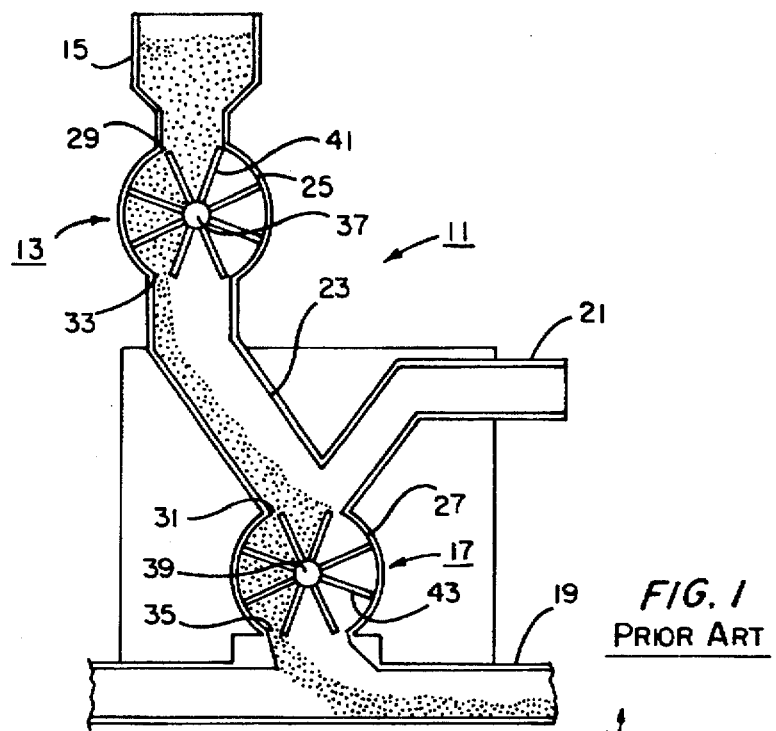
FIG. 1 is a side, schematic view of a prior art hopper discharge apparatus showing a pair of prior art rotary airlock valves, each valve having a mechanically driven rotor having a plurality of vanes mounted thereon.

FIG. 1 shows a prior art, rotary airlock valve system, designated generally as 11. The system features a first rotary airlock valve 13 which communicates with the discharge 15 of a fabric filter dust collector (not shown). The system also includes a second rotary airlock valve 17 for receiving particulate solids from the valve 13 and for passing the solids out a discharge conduit 19. A vent duct 21 also communicates with the connecting conduit 23 which extends between the first and second airlock valves 13, 17.

Each of the prior art airlock valves 13, 17 includes a valve housing 25, 27 which is generally cylindrically shaped and which includes an inlet opening 29, 31 and an outlet opening 33, 35. A rotor 37, 39 carries a plurality of outwardly extending vanes 41, 43 which may be equipped with seal and/or wear strips constructed of neoprene, Teflon, urethane, stainless steel or brass. A conventional drive mechanism, such as an electric motor, is connected to the rotor shafts 37, 39 through connecting linkages such as sprockets, chains and gears.

Figure 2:
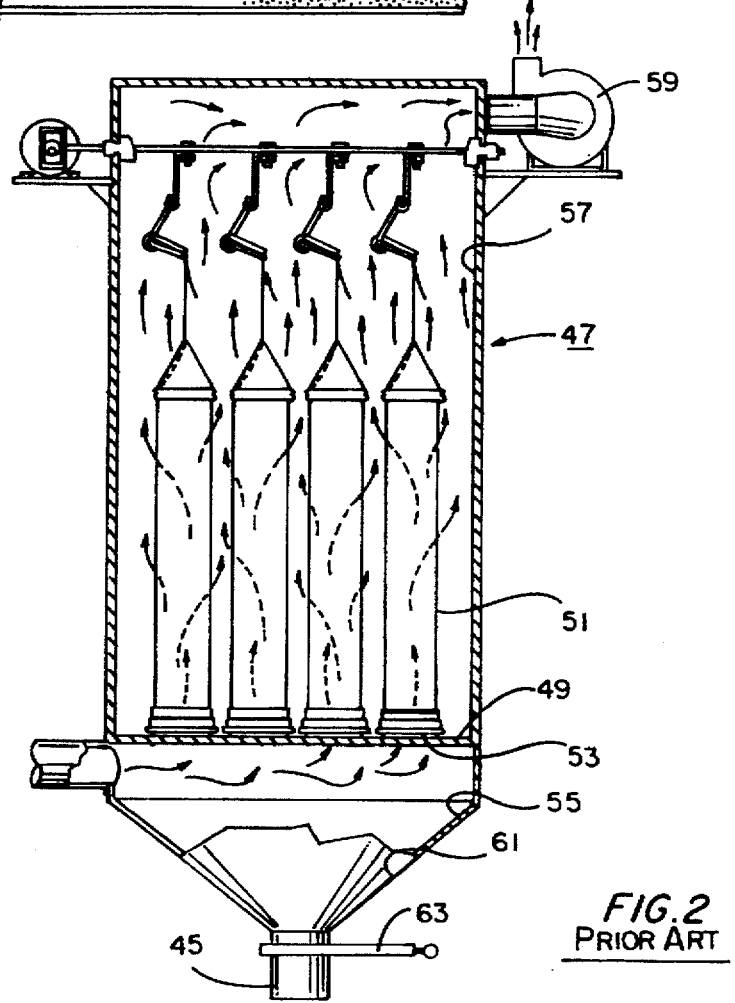
FIG. 2 is a side, cross-sectional view of a prior art fabric filter dust collector having a hopper discharge of the type which would be connected to the airlock valve of the invention.

FIG. 2 shows a prior art fabric filter dust collector apparatus of the type which would include a discharge 45 which might be connected to the prior art rotary airlock valve 11 of FIG. 1. While the airlock valve of the present invention might be applied to any of a number of solids transfer systems, it will be explained with reference to FIG. 2 for ease of understanding. Fabric filtration is one technique which has proved to be efficient in separating undesirable particulate matter from a gas stream in industrial environments. Such filtration is typically performed in a dust collection apparatus known as a "baghouse" (47 in FIG. 2). The baghouse is typically a sheet metal housing which is divided into two chambers by a tube sheet 49. Cylindrical fabric filters 51 are disposed within openings 53 in the tube sheet. Particulate containing gas is blown into, in this case the lower chamber 55, where dust accumulates on the inside of the fabric filter 51. The cleaned gas passes through the fabric and into the upper chamber 57 from which it exits an exhaust duct by means of an exhaust fan 59.

Typical baghouse arrangements includes a plurality of cylindrical filter bags with closed upper ends which are vertically suspended in the clean air chamber from a bag support framework. The lower ends of the bags are fixed to openings in the tube sheet. Filtration of the gas occurs from the inside to the outside of the bags. When it is necessary to clean the filter cake from the fabric bags, the flow of process gas is temporarily interrupted so that reverse air can be forced from the clean air chamber to the dirty air chamber. The reverse flow of cleaning air causes the dust cake on the filter bags to be dislodged and fall through the interior of the bags to the dirty air chamber for removal. The particulate matter which makes up the dust cake falls through the cone shaped portion 61 of the lower chamber 55 to a discharge conduit 45. A gate valve 63 may be employed to control the discharge.

Figure 3:
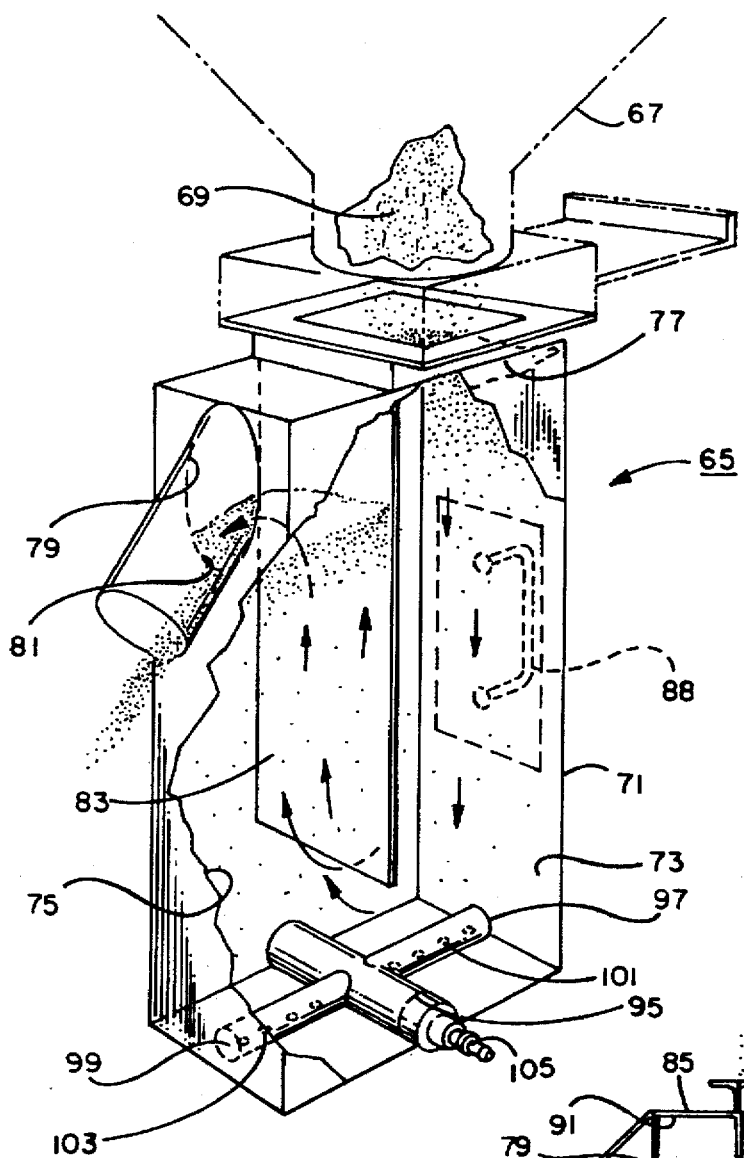
FIG. 3 is a perspective view, partially broken away, of the airlock valve of the invention showing the flow of particulate solids therethrough.

FIG. 3 shows an improved airlock valve of the invention designated generally as 65. The airlock valve 65 is used to pass particulate solids from a first pressure environment, for example within the hopper discharge 67 of a fabric filter dust collector, to a second, different pressure environment. The particulate solids could be the dust, particulate filter cake 69 from the fabric filter of FIG. 2.

The improved airlock valve 65 includes a valve body 71, which in this case is a generally rectangular shaped container having an inlet chamber 73 which communicates with the hopper discharge 67 of the fabric filter dust collector by means of an inlet opening 77 for receiving particulate solids entering at a first pressure. The valve body 71 also has an outlet chamber 75 for receiving particulate solids passing from the inlet chamber 73. The outlet chamber 75 has a discharge opening 79 which includes a weir 81 which communicates with a second pressure environment different from the first pressure environment. By "weir" is meant an obstruction in a fluid stream for diverting a fluidized material through a prepared aperture. In this case, the fluidized material would be the particulate solids from the dust cake 69 which are passing through the valve body 71 and out the discharge opening 79 to the second pressure environment.

As will be explained more fully, the inlet and outlet chambers are preloaded with solid particulate so that the particulate material occupies the internal volume of the inlet and outlet chambers to at least the level of the weir 81, even when the system is not being operated in a fluidized state to pass solids out the discharge opening. In normal operation, a head of material "h" in FIG. 4) will exist in the inlet chamber 73. However, even if the head "h" is not present, the level of particulate material within the chambers 73, 75, stays at least to the level of the weir 81 in order to maintain an air tight seal between the inlet and discharge openings of the valve.

Figure 4:
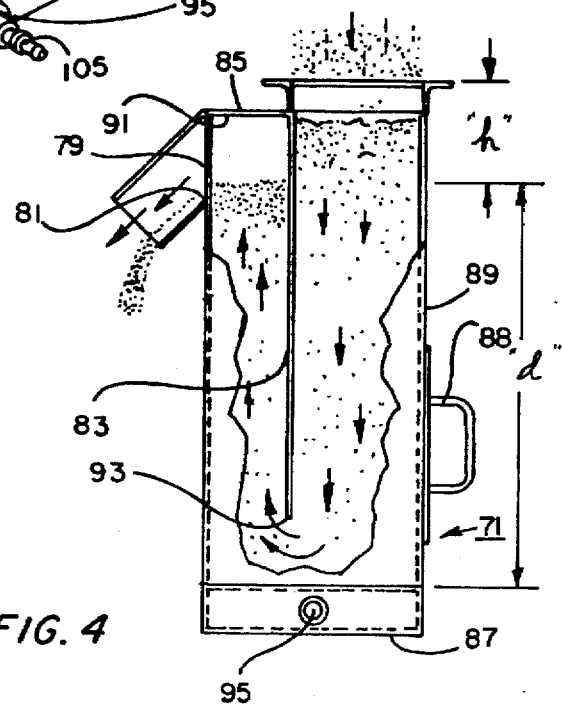
FIG. 4 is a side, cross-sectional view of the airlock valve of FIG. 3 of the invention with arrows indicating the direction of flow of the particulate solids therein.

At least one baffle 83 divides the inlet chamber 73 and the outlet chamber 75. As best seen in FIG. 4, the valve body 71 preferably comprises a container having a top 85, a bottom 87 and interconnecting vertical sidewalls 89 which together define a closed interior 91. A door 88 provides convenient access to the interior of the valve body when required but is normally sealed in use. The hopper discharge 67 of the fabric filter dust collector is connected to an inlet opening provided in the top wall 85 of the container. The discharge opening 79 of the container is located in one of the vertical, interconnecting sidewalls at a height which is slightly below the height of the inlet opening 77. The baffle 83 is a generally planar, vertical panel which is located between the hopper discharge opening in the top of the container and the discharge opening 79 in the interconnecting sidewall. Preferably, the baffle panel 83 is connected to the top 85 of the container within the enclosed interior 91 and extends generally vertically downward in the direction of the bottom 87 of the container, generally perpendicular thereto. As can be seen from FIG. 4, the baffle 83 is of a lesser relative length than the interconnecting sidewalls 89 of the container, whereby a gap exists between a lowermost extent 93 of the baffle 83 and the bottom 87 of the container.

Depending upon the type of solids being processed, two or more baffles might be arranged within enclosed interior 91 of the valve body 71. Generally, the lighter the material being processed, the greater the number of baffles required.

A fluidization means is located within the valve body 71 for fluidizing particulate solids in the inlet chamber 73 and the outlet chamber 75, whereby fluidized particulate solids pass around the baffle 83 from the inlet chamber 73 to the outlet chamber 75 and over the weir 81 of the discharge opening 79 to thereby discharge particulate solids to the second, different pressure environment.

Preferably, the fluidization means comprises a pneumatic supply tube 95 which communicates a pressurized gas to the particulate solids contained within the inlet chamber and the outlet chamber for fluidizing the particulate solids contained therein. As best seen in FIG. 3, the pneumatic supply tube 95 can be a gas supply line for supplying compressed air or nitrogen from a supply source to the closed interior of the container. In the embodiment of FIG. 3, the supply tube 95 has perpendicularly extending branches 97, 99 which extend within the inlet chamber 73 and outlet chamber 75, respectively, at the lower extents thereof. The branches 97, 99 have a plurality of downwardly facing apertures 101, 103 for admitting compressed gas to the interior of the container. A conventional coupling 105 is provided for attaching the supply tube 95 to a source of compressed gas.

The source of compressed gas supplied to the pneumatic supply tube 95 can be controlled in conventional manner to provide a periodic or "pulsed" supply of fluidizing gas to the chambers. This can be readily accomplished, for example, by installing a solenoid valve and an electronic timer within the inlet conduit leading to the supply tube 95. The timer would be set to inject a quantity of air periodically which was sufficient to keep particulate material moving through the valve from the inlet to the discharge opening 79.

In the method of operation of the improved airlock of the invention, particulate solids are collected from the hopper discharge of a fabric filter dust collector within the inlet chamber 73 of the device, the particulate solids entering from a first pressure environment. The airlock valve of the invention replaces motorized rotary airlocks or flapper type airlocks having mechanically operated moving parts. It passes solids between two different pressure environments, all in the absence of moving parts. The "airlock" is established by the mass of discharge material in the inlet chamber 73 of the device, combined with the solids in the outlet chamber 75. In a static mode, the closed interior of the container merely fills up, backing up into the hopper discharge 67, until the airlock is fluidized by the admission of compressed air through the supply tube 95. Upon fluidization, the mass of particulate material becomes active, behaving much like a pan of boiling water. However, it is not necessary to increase the temperature of the particulate material for the valve to operate. The admission of compressed air causes the material to act as a fluid, seeking its own level. As a result, particulate solids are caused to flow over the weir of the discharge opening until the particulate solids in the hopper have been depleted. The mechanism for fluidization is the compressed gas supplied through the supply tube 95. Compressed air can be introduced by means of an automatically controlled solenoid valve on the supply conduit. The cycle can be continuous, automatically timed, or it can be a predetermined cycle based upon demand initiated by a level control situated within the hopper. The valve can be installed directly on the discharge 67 of the hopper or at a screw conveyor discharge on a larger unit.

As previously explained, the internal volume of the inlet and outlet chambers 73, 75 are preferably "preloaded" with a particulate material up to the weir 81 level. This can be done in any convenient manner, such as by operating the baghouse and passing a small amount of particulate material through the inlet opening 77 until material collects in the chambers 73, 75. An airlock is now established and will be maintained whether or not the unit is in operation or whether a head "h" exists within the inlet chamber 73. No air leakage can occur around the baffle 83 because of the volume of either fluid or static particulate material within the chambers 73, 75.

Preferably, the minimum bed depth ("d" in FIG. 4) of particulate material in the chambers 73, 75 is at least about 30 inches of particulate material, for a total "material seal" of about 60 inches (inlet chamber plus outlet chamber). This dimension is based upon the premise that it takes about 1–2 inches of water column pressure to overcome each inch of depth of particulate material in a fluid bed. The amount of "material seal" is selected, for a particular application, to resist a pressure or vacuum on either side of the valve which would break the airlock seal and allow the leakage of air. For most baghouse applications operating at 15–20 inches of water column positive or negative pressure, 60 inches of material seal in the present valve design has proved to be sufficient.

An invention has been provided with several advantages. The improved airlock valve of the invention has no moving parts and no wear parts. Motorized rotary airlocks typically have as many as 20 moving parts and employ adjustable tips, shear bars, and the like which require periodic maintenance and replacement. The drive mechanisms for motorized rotary airlocks also employ sprockets, gears, chains and guards which require maintenance and replacement. The airlock of the invention does not require closely machined parts to achieve an air seal. Rotary airlocks typically require aerospace machined tolerance in the rotors, housing, shafts and plates. The airlock of the invention does not require an expensive motor or mechanical drive. The prior art rotary airlocks were high maintenance items due to the close tolerances required for air seal and thus high wear and replacement items.

The airlock of the invention is not temperature critical and can be used in high temperature applications (800° F.). The prior art rotary airlocks which were used in high temperature applications were required to be built and machined to exact tolerance for specific operating temperatures. If the tolerances were not precise, expansion and binding of the valve could occur. The rotors of the prior art devices were normally constructed by welding heavy section vanes onto the rotor shaft, followed by stress relieving and then machining of the parts to achieve close tolerances. The components of the airlock valve of the invention are welded units requiring no machining or stress relieving.

While the invention has been shown in only one of its forms, it is not thus limited but is susceptible to various changes and modifications without departing from the spirit thereof.

What is claimed is:

1. A method for discharging particulate solids collected from the hopper discharge of a fabric filter dust collector from a first pressure environment to a second, different pressure environment, the method comprising the steps of:

collecting the particulate solids discharged from a fabric filter dust collector within an inlet chamber of a fluid bed operated air lock valve;

providing an outlet chamber for receiving particulate solids passing from the inlet chamber, the outlet chamber also being provided with a discharge opening which includes a weir which communicates with the second pressure environment different from the first pressure environment;

providing at least one baffle dividing the inlet chamber and the outlet chamber;

fluidizing the particulate solids in the inlet and outlet chambers, whereby the fluidized particulate solids pass from the inlet chamber to the outlet chamber and over the weir of the discharge opening to thereby discharge particulate solids to the second, different pressure environment; and preloading the inlet chamber and outlet chambers with a volume of particulate solids to at least a level of the discharge opening of the outlet chamber, whereby the volume of particulate solids maintains a continuous airlock between the inlet chamber and the discharge opening of the outlet chamber during the operation of the airlock valve.

2. The method of claim 1, wherein the fluidizing step is accomplished by providing a pneumatic supply tube which communicates a pressurized gas to the particulate solids contained within the inlet chamber and the outlet chamber for fluidizing the particulate solids contained therein.

3. The method of claim 2, further comprising the steps of controlling the flow of pressurized gas to the pneumatic supply tube to control the rate of discharge of particulate solids from the discharge opening of the outlet chamber.

4. The method of claim 1, wherein the weir is located at a height within the outlet chamber which provides a minimum of 30 inches of particulate solids within the outlet chamber.

5. A method for discharging particulate solids collected from the hopper discharge of a fabric filter dust collector from a first pressure environment to a second, different pressure environment while maintaining an air tight seal, the method comprising the steps of:

providing an airlock valve including a valve body having an inlet chamber with an inlet opening which is connected to the hopper discharge of the fabric filter dust collector for receiving particulate solids entering from the first pressure environment;

providing the valve body with an outlet chamber for receiving particulate solids passing from the inlet chamber, the outlet chamber having a discharge opening located at a height just below the inlet opening to the inlet chamber and including a weir which communicates with the second pressure environment different from the first pressure environment;

providing at least one baffle dividing the inlet chamber and the outlet chamber within the valve body;

fluidizing particulate solids in the inlet and outlet chambers, whereby the fluidized particulate solids pass around the baffle from the inlet chamber to the outlet chamber and over the weir of the discharge opening to thereby discharge particulate solids to the second, different pressure environment; and preloading the inlet chamber and outlet chamber with a volume of particulate solids to at least a level of the discharge opening of the outlet chamber and maintaining the level of particulate solids passing through the airlock valve to at least the level of the discharge opening of the outlet chamber, whereby the volume of particulate solids maintains a continuous airlock between the inlet chamber and the discharge opening of the outlet chamber during the operation of the airlock valve.

6. The method of claim 5, wherein the valve body comprises a container having a top, a bottom and interconnecting sidewalls which define a closed interior, the hopper discharge of the fabric filter dust collector being connected to an opening provided in the top of the container, the discharge opening of the container being located within one of the interconnecting sidewalls and wherein the baffle is a generally planar vertical panel located between the hopper discharge opening in the top of the container and the discharge opening in the interconnecting sidewall.

7. The method of claim 6, wherein the baffle panel is connected to the top of the container within the closed interior thereof and extends generally vertically downward in the direction of the bottom of the container, the baffle being of a lesser relative length than the interconnecting sidewalls of the container, whereby a gap exists between a lowermost extent of the baffle and the bottom of the container.

8. The method of claim 7, wherein the fluidization means includes a pneumatic supply tube which communicates a pressurized gas to the particulate solids contained within the inlet chamber and the outlet chamber for fluidizing the particulate solids contained therein.

9. The method of claim 8, wherein the pneumatic supply tube extends below the baffle between the interconnecting sidewalls of the container.

10. The method of claim 9, wherein the pneumatic supply tube is a pipe having discharge openings provided therein and the pressurized gas is air.

* * * * *